United States Patent
Mochizuki

(10) Patent No.: US 8,431,681 B2
(45) Date of Patent: Apr. 30, 2013

(54) COATING COMPOSITION AND COAT ARTICLE COATED THEREWITH

(75) Inventor: Kaoru Mochizuki, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 175 days.

(21) Appl. No.: 12/023,775

(22) Filed: Jan. 31, 2008

(65) Prior Publication Data

US 2008/0199705 A1    Aug. 21, 2008

(30) Foreign Application Priority Data

Feb. 1, 2007    (JP) .................................. 2007-022817

(51) Int. Cl.
*C08G 59/02* (2006.01)

(52) U.S. Cl.
USPC .......................................... 528/408; 526/327

(58) Field of Classification Search .................. 526/327; 528/408
See application file for complete search history.

(56) References Cited

U.S. PATENT DOCUMENTS

| | | | | |
|---|---|---|---|---|
| 4,812,549 A | * | 3/1989 | Muramoto et al. | 526/318 |
| 5,166,265 A | * | 11/1992 | Nakahata et al. | 525/101 |
| 5,827,575 A | * | 10/1998 | Kasari et al. | 427/380 |
| 2003/0032729 A1 | * | 2/2003 | Takai et al. | 525/107 |

FOREIGN PATENT DOCUMENTS

| | | |
|---|---|---|
| JP | 02232221 | 9/1990 |
| JP | H04-136022 | 5/1992 |
| JP | 2001172556 | 6/2001 |
| JP | 2004-002864 | 1/2004 |
| JP | 2004002864 | 1/2004 |
| JP | 2006-291014 | 10/2006 |
| WO | WO 97/02311 | 1/1997 |

OTHER PUBLICATIONS

Arguments from the first Office Action dated Jan. 4, 2012 from the corresponding Japanese Patent Application No. 2007022817 with English translation (9 pages).

* cited by examiner

*Primary Examiner* — Kuo-Liang Peng

(74) *Attorney, Agent, or Firm* — Howard & Howard Attorneys PLLC

(57) ABSTRACT

A coating composition includes, with respect to (1) 100 parts by weight of epoxy-group contained polyester modified vinyl polymer (D) obtained by copolymerization of a vinyl monomer (A) containing an alicyclic epoxy group and a vinyl monomer (B) containing polyester in a side chain, (2) 0.01 to 10 parts by weight of an organic metal compound, and (3) 0.01 to 10 parts by weight of a silicon compound having a silanol group.

16 Claims, No Drawings

COATING COMPOSITION AND COAT ARTICLE COATED THEREWITH

RELATED APPLICATION

This application claims priority to Japanese Patent Application No. 2007-022817 filed Feb. 1, 2007.

FIELD OF THE INVENTION

The present invention relates to a coating composition and a coat article coated therewith, and, particularly, to a coating composition which can be coated on plastic directly or via a base coat, and a coat article coated therewith directly or via a base coat.

DESCRIPTION OF THE RELATED ART

Recently, application of plastics to industrial materials is increasing because of its lightness and excellent workability, and plastics are used as substitutes for, for example, glass products, wood products and metallic products.

However, plastics, particularly, general-purpose plastics (e.g., a polycarbonate resin, an ABS resin, and an acrylic resin, and a resin alloy containing them) are not excellent in mar-proof. Therefore, molded articles of general-purpose plastic are likely to have mars on their surfaces at the time of packaging, transportation, assembling and so forth. As a result, the surface of a molded article may be disfigured, degrading the value of the product. In addition, general-purpose plastics generally have poor weather resistance. When the molded article is used outdoor where it is exposed to sun light, therefore, the molded article is likely to be yellowed or degraded.

As a solution to such a problem, Unexamined Japanese Patent Application KOKAI Publication No. 2004-2864 proposes a surface coated plastic molded article in which a urethane-based coating material containing an ultraviolet absorber is applied to the top surface of a plastic resin which is thermally cured to form a protective coat.

It is further desirable that a coating to be applied to a plastic molded article should have an improved durability, such as improvements on mar-proof and adhesion to a base material. Accordingly, various kinds of hard coats are studied, such as a method of using a silicone hard coat as a protective coat and a method of using an ultraviolet curable resin for a protective coat.

The protective coat obtained by a silicone hard coat is a hard coat having an excellent scratch resistance, and is very hard and excellent in mar-proof. The protective coat obtained by an ultraviolet curable resin, like a silicone hard coat, forms a very hard coat and is excellent in scratch resistance. However, those protective coats have poor adhesion to a plastic material, and are difficult to be directly applied to a plastic material. Because of the high hardness, the protective coats are apt to have cracks due to ultraviolet-originated deterioration, which is likely to damage a coat article.

Because the protective coat obtained by an ultraviolet curable resin is formed by curing a resin containing an ultraviolet absorber with ultraviolet irradiation, it cannot contain a sufficient amount of an ultraviolet absorber. Therefore, the protective coat obtained by an ultraviolet curable resin has a difficulty in acquiring an excellent weather resistance. There are two ways of allowing the coat to contain a sufficient amount of an ultraviolet absorber: a double coating method and a method of making a membrane thicker.

The double coating method forms a coat (first coat) on a non-ultraviolet curable resin having an ultraviolet absorber contained in a plastic material and then forms an ultraviolet cure type coat excellent in mar-proof (second coat). According to the method, the first coat and the second coat have distributed functions, so that the performance is easily balanced. According to the method, however, the processes become troublesome and the ultraviolet curable resin has poor weather resistance, so that separation easily occurs at the interface between both coats after weather resistance.

The method of making a membrane thicker reduces the concentration of the ultraviolet absorber per unit weight by forming a coat as thick as possible, thereby making it hard to cause ultraviolet-originated inhibition of hardening. This method can form a coat having an excellent coat surface appearance. Because this method makes the coat thicker, however, stress originated from cure shrinkage becomes greater, leaving deformation inside the coat. This makes the coat easily crackable by shocks or heat. If the coat is made somehow soft to prevent cracking of the coat by the method, the mar-proof of the coat decreases.

Preventing the ultraviolet-oriented degradation of plastic articles and improving the mar-proof of articles are effective in keeping the beautiful appearances of articles and improving the durability thereof, such as elongating the lives of the articles. Therefore, it is aspired to develop a coating which matches with the resin characteristic of plastics, particularly, general-purpose plastic, has excellent adhesion to a plastic base material, mar-proof and coat surface appearance, and is excellent in weather resistance, and a molded article coated with the coating.

SUMMARY OF THE INVENTION

The present invention has been made in view of the foregoing situations, and it is an object of the invention to provide a coating composition excellent in weather resistance and a molded article coated therewith.

To achieve the object, a coating composition according to a first aspect of the invention is characterized by including, with respect to (1) 100 parts by weight of epoxy-group contained polyester modified vinyl polymer (D) obtained by copolymerization of a vinyl monomer (A) containing an alicyclic epoxy group and a vinyl monomer (B) containing polyester in a side chain, (2) 0.01 to 10 parts by weight of an organic metal compound, and (3) 0.01 to 10 parts by weight of a silicon compound having a silanol group.

According to a second aspect of the invention, there is provided a plastic coat article having the coating composition according to the first aspect coated directly or via a base coat.

DETAILED DESCRIPTION OF THE PREFERRED EMBODIMENT

A coating composition and a coat article coated therewith according to the present invention will be described below.

1. Coating Composition

The coating composition of the present invention includes (1) epoxy-group contained polyester modified vinyl polymer (D), (2) an organic metal compound and (3) a silicon compound having a silanol group.

(1) Epoxy-Group Contained Polyester Modified Vinyl Polymer (D)

As mentioned above, epoxy-group contained polyester modified vinyl polymer (D) used in the present invention is obtained by copolymerization of a vinyl monomer (A) containing an alicyclic epoxy group and a vinyl monomer (B) containing polyester in a side chain.

The "vinyl monomer (A) containing an alicyclic epoxy group" is added as a crosslinking reactable monomer in which ring opening of an alicyclic epoxy group is caused by a reaction of a silanol group to be discussed later with an organic metal compound to provide a crosslinking point at which a crosslinking reaction is possible. Such an alicyclic-epoxy-group contained vinyl monomer (A) is widely used as this kind of coating composition.

Specific examples of the alicyclic-epoxy-group contained vinyl monomer (A) are 3,4 epoxycyclohexylmethyl(meta)acrylate, 2[1,2 epoxy 4,7 methanoperhydroindene-5(6)-yl]oxyethyl(meta)acrylate, 5,6-epoxy-4,7 methanoperhydroindene-2 yl(meta)acrylate, 1,2 epoxy-4,7-methanoperhydroindene-5-yl(meta)acrylate, 2,3 epoxycyclopentenylmethyl(meta)acrylate, and the like.

The alicyclic-epoxy-group contained vinyl monomer (A) may be (meta)acrylic ester of 3-4-epoxycyclohexylmethyl polycaprolactone expressed by a formula $CH_2=CHR°COO[(CH_2)_5COO]_n$-ECHM ($R°$ is an H or methyl group, n is 1 to 10, ECHM is 3-4-epoxycyclohexylmethyl group).

Further, the alicyclic-epoxy-group contained vinyl monomer (A) may be an additive or the like of 3-4-epoxycyclohexylmethyloxirane, 3',4'-epoxycyclohexylmethyl-3,4-epoxycyclohexanecarboxylate or the like and (meta)acrylate.

The "vinyl monomer (B) containing polyester in a side chain" is to be copolymerized with the monomer (A) to improve mar-proof and adhesion. The copolymerization of the vinyl monomer (B) with the monomer (A) particularly improves scratch resistance (ability to recover from possible scratches).

It is preferable that polyester provided in a side chain should have a carbon number of 15 to 60. This is because with polyester having less than 15C, the coat becomes hard and is likely not to have a sufficient scratch resistance, whereas with polyester having more than 60C, the coat becomes too soft so that the scratch resistance and solvent resistance may drop.

It is preferable to use, as an ester chain, for example, β-lactone (carbon number: 3), γ-lactone (carbon number: 4), δ-lactone (carbon number: 5), and caprolactone (carbon number: 6). The ester chain preferably has lactone of five chains or more, and more preferably lactone of five to ten chains.

Particularly, it is preferable that the vinyl monomer (B) should be a vinyl monomer acquired by a ring opening reaction of ε, δ or γ-caprolactone with hydrogen-group contained acrylic ester.

It is more preferable that the polyester component should be polyester with caprolactone of five chains or more. This is because with caprolactone of the polyester component having less than five chains, as will be apparent from examples to be described later, the adhesion to a resin is deteriorated, and the scratch resistance may become lower. It is preferable that the polyester component should be polyester with caprolactone of five to ten chains.

Specific examples of the vinyl monomer (B) are a product of reaction of hydroxyalkyl(meta)acrylate with 5 mol of caprolactone, e.g., a product of reaction of hydroxyethyl (meta)acrylate with 5 mol of ε-caprolactone (PLACCEL FA(FM)5 produced by Daicel Chemical Industries, Ltd.), a product of reaction of hydroxyalkyl(meta)acrylate with 10 mol of caprolactone, e.g., a product of reaction of hydroxyethyl(meta)acrylate with 10 mol of ε-caprolactone (PLACCEL FA10, FM10 produced by Daicel Chemical Industries, Ltd.), etc. Beside the aforementioned ethyl, alkyl may be alkyl having a large carbon number, e.g., hydroxylbutyl, propyl and so forth.

It is preferable that the polymerization ratio of the vinyl monomer (A) and the vinyl monomer (B) should be 30 to 80 parts by weight of the vinyl monomer (B) with respect to 100 parts by weight of epoxy-group contained polyester modified vinyl polymer (D) which is the polymerization of (A) and (B). With less than 30 parts by weight of the vinyl monomer (B), the effect of improving the mar-proof may become insufficient, whereas with over 80 parts by weight of the vinyl monomer (B), the crosslinking reaction becomes insufficient, so that the coat may become too soft.

It is preferable that the resin composition of the present invention should include a vinyl monomer (C) polymerizable with the monomer (A) and monomer (B). Such a vinyl monomer (C) can be polymerized to control the property of the resin, such the glass transition point or the number-average molecular weight of the epoxy-group contained polyester modified vinyl polymer (D).

It is preferable that there should be 50 parts by weight or less, for example, 1 to 50 parts by weight of the vinyl monomer (C) with respect to 100 parts by weight of alicyclic-epoxy-group contained polyester modified vinyl polymer (D). This is because with over 50 parts by weight of the vinyl monomer (C), the crosslink density drops, thus lowering the mar-proof and solvent resistance (wax removability).

Specific examples of such a vinyl monomer (C) are "(meta)acrylic ester", "carboxyl-group or alkoxycarbonyl-group contained vinyl monomer", "anhydride-group contained vinyl monomer", "non-alicyclic-epoxy-group contained vinyl monomer", "aromatic vinyl monomer", "hydroxyl-group contained vinyl monomer", etc.

As "(meta)acrylic ester", for example, there are acrylic alkylesters having a carbon number of 1 to 18, such as methyl (meta)acrylate, ethyl(meta)acrylate, n-propyl(meta)acrylate, iso-propyl(meta)acrylate, n-butyl(meta)acrylate, iso-butyl (meta)acrylate, tert-butyl(meta)acrylate, n-hexyl(meta)acrylate, n-octyl(meta)acrylate, 2-ethylhexyl(meta)acrylate, and lauryl(meta)acrylate.

As the "carboxyl-group or alkoxycarbonyl-group contained vinyl monomer", for example, there are dialkylester groups, such as dimethyl maleate or dimethyl fumarate, in addition to unsaturated dihydric acids, such as (meta)acrylic acid, maleic acid, fumaric acid, and itaconic acid.

As the "anhydride-group contained vinyl monomer", for example, there are maleic anhydride and itaconic anhydride.

As the "non-alicyclic-epoxy-group contained vinyl monomer", for example, there is glycidyl(meta)acrylate or the like.

As the "aromatic vinyl monomer", for example, there are styrene, α-methylstyrene, and vinyl styrene.

As the "hydroxyl-group contained vinyl monomer", for example, there are hydroxyalkyl(meta)acrylates having a carbon number of 2 to 8, such as 2-hydroxyethyl(meta)acrylate, 2-hydroxypropyl(meta)acrylate, and 4-hydroxybutyl(meta)acrylate.

In addition, the vinyl monomer (C) may be (meta)acrylonytril, vinyl acetate, vinyl propionate, butadiene, isoprene, chloroprene and the like.

It is preferable that the glass transition point the epoxy-group contained polyester modified vinyl polymer (D) synthesized by such a vinyl monomer (C) should be −60 to 20° C. This is because at lower than −60° C., the polymer is too soft so that the scratch resistance becomes lower, whereas at higher than 20° C., the polymer becomes too hard so that the scratch resistance is likewise impaired.

The number-average molecular weight of the epoxy-group contained polyester modified vinyl polymer (D) is preferably 1000 to 40000. This is because with the number-average molecular weight being less than 1000, the polymer is hard to produce and the desired coating performance may not be acquired, whereas the number-average molecular weight exceeding 40000, the adhesion may be deteriorated. The glass transition point and number-average molecular weight of the epoxy-group contained polyester modified vinyl polymer (D), particularly, the glass transition point, can be controlled by the polymerization ratio of the vinyl monomer (C).

(2) Organic Metal Compound

An organic metal compound used in the present invention can be any organic metal compound which acts on the epoxy group of the vinyl monomer (A) together with a silicon compound having a silanol group to be discussed later to cause ring opening and can crosslink the vinyl monomer (A).

As such an "organic metal compound", for example, there are complexes, such as Ga, Sn, Zr, Zn, Cu, Fe, Co, Ni, Mn, Cr, V, Pt, Mo and Pd, which have β-diketone, β-ketoestyl, salicylaldehyde derivative or the like as a ligand.

Specific examples of ligands are, for example, acetylacetone, benzoylacetone, trifluoroacetylacetone, hexafluoroacetylacetone, $PhCH_2COCH_2COCH_3$ (Ph indicating a phenyl group), $CH_3COCH(CH_3)COCH_3$, $(CH_3)_2CHCOCH_2COCH(CH_3)_2$, $CH_3COCH_2COOC_2H_5$, $CH_3COCH_2COOC_3H_7$, $CH_3COCH_2COOCH_3$, salicylaldehyde, 2-acetylphenol, 2-hydroxybenzophenone and so forth.

Specific examples of complexes, for example, there are gallium (II) acetylacetonate, zinc (II) acetylacetonate, zirconium (IV) acetylacetonate, copper (II) acetylacetonate, iron (II) acetylacetonate, cobalt (III) acetylacetonate, nickel (II) acetylacetonate, manganese (III) acetylacetonate, chromium (III) acetylacetonate, platinum (II) acetylacetonate and so forth.

Beside those complexes, an organic aluminum compound may be used. Specific examples of the compound are, for example, tris-methoxy aluminum, tris-ethoxy aluminum, tris-isopropoxy aluminum, tris-phenoxy aluminum, tris-paramethylphenoxy aluminum, isopropoxdiethoxyy aluminum tris-butoxy aluminum, tris-acetoxy aluminum, tris-stearate aluminum, tris-butyrate aluminum, tris-propionate aluminum, tris-isopropionate aluminum, tris-acetylacetonate aluminum (or aluminum tris-acetylacetonate), tris-fluoroacetylacetonate aluminum, tris-hexafluoroacetylacetonate aluminum, tris-ethylacetylacetate aluminum, tris-salicylaldehydate aluminum, tri-diethylmalonate aluminum, tris-propylacetylacetonate aluminum, tris-butylacetylacetate aluminum, tris-di-pivaloylmethanato aluminum, diacetylacetonatodi-pivaloylmethanato aluminum and following cyclic organic aluminum compounds (1) to (10). In the formulae of the cyclic organic aluminum compounds (1) to (10), Ph indicates a phenyl group, $B'''$ indicates m-phenylene group, $B''$ indicates a trihydric residue $C_6H_3$ having a bond potential at the first, second and fourth potentials of the benzene ring, and $A''$ indicates a quadrivalence residue $C_6H_2$ (quadrivalence) having a bond potential at the first, second, fourth and fifth potentials of the benzene ring.

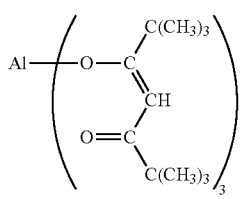

(1)

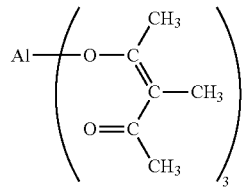

(2)

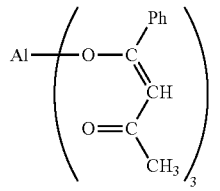

(3)

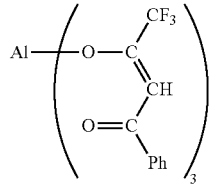

(4)

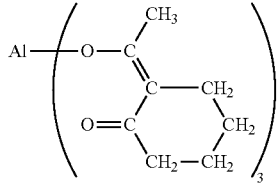

(5)

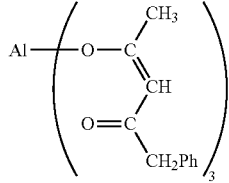

(6)

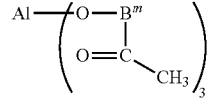

(7)

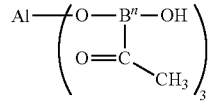

(8)

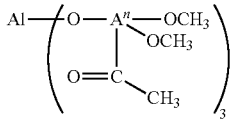

(9)

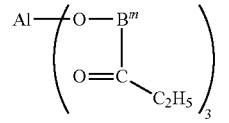

(10)

The amount of the organic metal compound in use is 0.01 to 10 parts by weight, preferably 1 to 5 parts by weight, with respect to 100 parts by weight of alicyclic-epoxy-group contained polyester modified vinyl polymer (D). With the amount less than 0.01 parts by weight, the coat cannot have a sufficient curing property, and with the amount exceeding 10 parts by weight, the adhesion of the cured coat may be decreased.

(3) Silicon Compound Having a Silanol Group

An "silicon compound having a silanol group" can be used in the present invention as long as it acts on the epoxy group of the vinyl monomer (A) together with the aforementioned organic metal compound to cause ring opening and can crosslink the vinyl monomer (A).

Such a silicon compound having a silanol group is preferably a "silicon compound which does not include siloxane bonding and has one or more silanol groups directly bonded to silicon and one or more electron withdrawing groups, e.g., a phenyl group". This is because if the siloxane bonding is included, the molecular weight becomes large, which may lower the crosslinking efficiency. Further, that is because if an electron withdrawing group, e.g., a phenyl group, is included, electrons are withdrawn to the phenyl group from the silanol group, leading to easy dissociation of hydrogen ions, so that the crosslinking reaction can be accelerated efficiently in cooperation with the organic metal compound. A silicon compound which has a large steric hindrance in the vicinity of the silanol group is more preferable. This is because if the steric hindrance in the vicinity of the silanol group is small, the growth reaction of cationic polymerization may be stopped, and the silanol group may be condensed to be deactivated.

Such a preferable silicon compound is a silicon compound which has at least one hydroxyl group and at least one phenyl group in one molecule and is expressed by a formula: Si(R1R2R3R4)

where R1, R2, R3 and R4 are an alkyl group, phenyl group, a vinyl group and hydroxyl group, respectively. Such a silicon compound is triphenylsilanol, diphenylsilanediol and the like.

The silicon compound having a silanol group has 0.01 to 10 parts by weight, preferably 1 to 5 parts by weight, with respect to 100 parts by weight of alicyclic-epoxy-group contained polyester modified vinyl polymer (D). This is because with less than 0.01 parts by weight of the silicon compound, crosslinking may be insufficient, while with more than 10 parts by weight thereof, the silicon compound is likely to remain as an impurity.

(4) Other Components

The coating composition of the present invention may further include a compound having a hydrolytic silyl group. This is because the addition of such a compound having a hydrolytic silyl group can improve the wax removability of the coating composition.

The compound having a hydrolytic silyl group may be a partial hydrolytic condensate of an alkoxysilane group, a partial hydrolytic condensate of an alkenyloxylane group, or the like in addition to an alkoxysilane group, an alkenyloxylane group, an acyloxysilane group, a halosilane group.

As the alkoxysilane group, for example, there are tetramethoxysilane, tetraethoxysilane, tetrabutoxysilane, methyltrimethoxysilane, ethyltrimethoxysilane, methyltriethoxysilane, diphenyldiethoxysilane and the like.

As the alkenyloxylane group, for example, there are tetraisopropenyloxysilane, phenyltriisopropenyloxysilane, and the like.

As the halosilane group, for example, there are tetrachlorosilane, phenyltrichlorosilane and the like.

It is preferable that such a compound having a hydrolytic silyl group should have 0.1 to 10 parts by weight of with respect to 100 parts by weight of the alicyclic-epoxy-group contained polyester modified vinyl polymer (D). This is because with less than 0.01 parts by weight of the compound, the wax removability may not be improved, while with over 10 parts by weight thereof, the compound may react with the silicon compound having a silanol group, deactivating silanol, which reducing the crosslink density.

The coating composition of the present invention may further include an ultraviolet absorber. The inclusion of the ultraviolet absorber can prevent ultraviolet-originated degradation of the coat, i.e., can improve the weather resistance of the coat.

As such an ultraviolet absorber, for example, there are a benzotriazole group, a benzophenone group, a triazine group, an anilide oxalate group, etc., which may be used singularly or a combination of two or more of which may be used.

The blending ratio of the ultraviolet absorber is preferably 0.01 to 10 parts by weight to 100 parts by weight of alicyclic-epoxy-group contained polyester modified vinyl polymer (D), and is more preferably 1 to 3 parts by weight. This is because with less than 0.01 parts by weight, the ultraviolet absorbing effect may become insufficient, while with over 3 parts by weight, the adhesion and mar-proof may become lower.

The coating composition of the present invention may further include a light stabilizer. This is because the inclusion of the light stabilizer can prevent light-originated degradation of the coat.

As such a light stabilizer, for example, there are hindered amine based compounds which may be used singularly or a combination of two or more of which may be used.

The amount of the light stabilizer to be used is preferably 0.01 to 10 parts by weight to 100 parts by weight of alicyclic-epoxy-group contained polyester modified vinyl polymer (D). This is because with less than 0.01 parts by weight, the effect of preventing the light-originated degradation of the coat may become insufficient, while with over 10 parts by weight, the adhesion and mar-proof may become lower.

The coating composition of the present invention may further include various additives which can be added to an ordinary coating, such as a leveling agent, a flow improver, and an oxidant inhibitor. Those various additives can be blended in a solution of the epoxy-group contained polyester modified vinyl polymer (D) to be discussed later according to the individual blending amounts.

(5) Manufacture Method

The coating composition structured in the above manner can be manufactured by, for example, adding an organic metal compound, a silicon compound having a silanol group, and the like in a solution of the epoxy-group contained polyester modified vinyl polymer (D).

The solution of the epoxy-group contained polyester modified vinyl polymer (D) can be prepared by dissolving or dispersing, for example, a vinyl monomer (A) containing an alicyclic epoxy group, vinyl monomer (B) containing polyester in a side chain, and the like in an organic solvent, and dropping 2 to 10 parts by weight of a polymerization initiator at a maintained polymerization temperature of, for example, 100 to 160° C. while being stirred to cause a polymerization reaction.

As the organic solvent, for example, an alcohol based solvent, ether based solvent, an ester based solvent, and a carbon hydride based solvent can be used. When a carbon hydride based solvent is used as an organic solvent, it is preferable to also use another solvent from the viewpoint of the solubility.

As the polymerization initiator, one used normally can be used, but it is preferable to use a polymerization initiator with a 10-hour half-life temperature of 50° C. to 110° C. or so. Specific examples thereof include peroxide compounds, such as t-butylperoxypivalate, t-butylperoxyneodecanoate, t-butylperoxy-2-ethylhexanoate, and t-butylperoxy-3,5,5-trimethylhexanoate, and an azo-bis-nytril group, such as azo-bis-isobutyrosnytril and azo-bis-dimethylvaleronytril.

Further adding a compound which can be a ligand of an organic metal compound to the coating composition of the present invention can provide a single-liquid coating with a better can stability.

As the compound which can be a ligand of an organic metal compound, for example, a β-diketone group, such as 2-4-pentadione(acetylacetone) and 2-4-heptanedione; a ketoester group, such as methyl acetoacetate, butyl acetoacetate and acetoacetic ester; hydroxylcarboxylate, such as lactate, methyl lactate, ethyl lactate, ammonium lactate, salicylic acid, methyl salicylate, ethyl salicylate, phenyl salicylate, malic acid, ethyl malate, methyl malate, tartaric acid, methyl tartrate, and ethyl tartrate, ester or salt of the hydroxylcarboxylate; ketoalcohol, such as 4-hydroxy-4-methyl-2-pentanone, 4-hydroxy-2-pentanone, 4-hydroxy-2-heptanone, and 4-hydroxy-4-methyl-2-heptanone; aminoalcohol, such as monoethanolamine, diethanolamine, triethanolamine, N-methyl-monoethanolamine, N-methyl-monoethanolamine, N-ethyl-monoethanolamine, N,N-dimethylethanolamine, and N,N-diethanolamine; and enol form active hydrogen compounds, such as diethyl ester, methylol melamine, methylol urea, and methylol acrylamide.

2. Coat Article

A coat article of the present invention is a molded article, e.g., a plastic molded article, on whose top surface the coating composition of the present invention is coated directly or via a base coat, and which is then dried.

Plastic molded articles are various kinds of molded article such as injection-molded article, extrusion-molded article and a compression-molded article.

While various kinds of plastics are available, particularly, general-purpose plastics (for example, a polycarbonate resin, an ABS resin, and an acrylic resin, or a resin alloy containing the same) are preferable. The resin alloys containing them include alloys of an ABS resin and a vinyl chloride resin, a (meta)acrylate resin, a polycarbonate resin, a polyester resin, a polyamide resin, etc.

EXAMPLES

Next, the present invention will be described in more detail by way of examples and comparative examples. In the following description, "part" means "part by weight".

Manufacture Example 1

Prepared Example of Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 45 parts of 3-4-epoxycyclohexylmethyl acrylate (CYCLMER A200: trade name: by Daicel Chemical Industries, Ltd.) as an alicyclic-epoxy-group contained vinyl monomer, 55 parts of a 10-mol additive of ε-caprolactone of 2-hydroxyethylacrylate as a vinyl monomer containing polyester in a side chain (PLACCEL FA-10: trade name: by Daicel Chemical Industries, Ltd.), and 7 parts of AIBN (azo-bis-isobutyronytril) as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained polyester modified vinyl polymer solution #A with 50% of a nonvolatile portion and a number-average molecular weight of 7000.

Manufacture Example 2

Prepared Example of Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 40 parts of 3-4-epoxycyclohexylmethyl acrylate (CYCLMER A200: trade name: by Daicel Chemical Industries, Ltd.) as an alicyclic-epoxy-group contained vinyl monomer, 40 parts of a 5-mol additive of ε-caprolactone of 2-hydroxyethylmethacrylate (PLACCEL FM-5: trade name: by Daicel Chemical Industries, Ltd.) as a vinyl monomer containing polyester in a side chain, 10 parts of butylmethacrylate as a vinyl monomer polymerizable with them, 10 parts of butylacrylate, and 7 parts of AIBN as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained polyester modified vinyl polymer solution #B with 50% of a nonvolatile portion and a number-average molecular weight of 7000.

Manufacture Example 3

Prepared Example of Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 40 parts of CYCLMER A200 as an alicyclic-epoxy-group contained vinyl monomer, 40 parts of PLACCEL FA-10 (produced by Daicel Chemical Industries, Ltd.: a 10-mol additive of ε-caprolactone of 2-hydroxyethylacrylate) as a vinyl monomer containing polyester in a side chain, 10 parts of butylmethacrylate as a vinyl monomer polymerizable with them, 10 parts of butylacrylate, and 7 parts of AIBN as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained polyester modified vinyl polymer solution #C with 50% of a nonvolatile portion and a number-average molecular weight of 7000.

Manufacture Example 4

Prepared Example of Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 30 parts of CYCLMER A200 as an epoxy-group contained vinyl monomer, 30 parts of PLACCEL FM-5 (produced by Daicel Chemical Industries, Ltd.: a 5-mol additive of ε-caprolactone of 2-hydroxyethylmethacrylate) as a vinyl monomer containing polyester in a side chain, 20 parts of butylmethacrylate as a vinyl monomer polymerizable with them, 20 parts of butylacrylate, and 7 parts of AIBN as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained polyester modified vinyl polymer solution #D with 50% of a nonvolatile portion and a number-average molecular weight of 7000.

Manufacture Example 5

Prepared Example of Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 40 parts of CYCLMER A200 as an alicyclic-epoxy-group contained vinyl monomer, 40 parts of PLACCEL FA-2 (produced by Daicel Chemical Industries, Ltd.: a 2-mol additive of ε-caprolactone of 2-hydroxyethylacrylate) as a vinyl monomer containing polyester in a side chain, 10 parts of butylmethacrylate as a vinyl monomer polymerizable with them, 10 parts of butylacrylate, and 7 parts of AIBN as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained polyester modified vinyl polymer solution #E with 50% of a nonvolatile portion and a number-average molecular weight of 7000.

Manufacture Example 6

Prepared Example of Polyester-Unmodified Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 40 parts of CYCLMER A200 as an alicyclic-epoxy-group contained vinyl monomer, 20 parts of butylmethacrylate as a vinyl monomer polymerizable with them, 40 parts of butylacrylate, and 7 parts of AIBN as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained vinyl polymer solution #F with 50% of a nonvolatile portion and a number-average molecular weight of 7000.

Manufacture Example 7

Prepared Example of Polyester-Unmodified Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 40 parts of CYCLMER A200 as an alicyclic-epoxy-group contained vinyl monomer, 40 parts of 2-hydroxyethylacrylate as a vinyl monomer polymerizable with them, 20 parts of butylacrylate, and 7 parts of AIBN as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained vinyl polymer solution #G with 50% of a nonvolatile portion and a number-average molecular weight of 7000.

Manufacture Example 8

Prepared Example of Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 40 parts of CYCLMER A200 as an alicyclic-epoxy-group contained vinyl monomer, 10 parts of PLACCEL FA-10 as a vinyl monomer containing polyester in a side chain, 30 parts of butylmethacrylate as a vinyl monomer polymerizable with them, 20 parts of butylacrylate, and 7 parts of AIBN as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained polyester modified vinyl polymer solution #H with 50% of a nonvolatile portion and a number-average molecular weight of 7000.

Manufacture Example 9

Prepared Example of Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 30 parts of CYCLMER A200 as an alicyclic-epoxy-group contained vinyl monomer, 30 parts of PLACCEL FM-5 as a vinyl monomer containing polyester in a side chain, 40 parts of isobornylmethacrylate as a vinyl monomer polymerizable with them, and 7 parts of AIBN as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained polyester modified vinyl polymer solution #I with 50% of a nonvolatile portion and a number-average molecular weight of 7000.

Manufacture Example 10

Prepared Example of Alicyclic-Epoxy-Group Contained Polyester Modified Vinyl Polymer First, 40 parts of toluene as an organic solvent, and 50 parts of isobutyl acetate were fed into a reactor provided with an agitator, a thermometer, a reflux condenser tube and a nitrogen inlet pipe, and the temperature was raised to 100° C. in the nitrogen atmosphere. Next, a mixture of 40 parts of CYCLMER A200 as an alicyclic-epoxy-group contained vinyl monomer, 40 parts of PLACCEL FA-10 as a vinyl monomer containing polyester in a side chain, 10 parts of butylmethacrylate as a vinyl monomer polymerizable with them, 10 parts of butylacrylate, and 0.5 part of AIBN as a polymerization initiator was dropped in two hours. After the end of dripping, the mixture was aged for two hours at the same temperature, and then a mixture of 1 part of AIBN and 10 parts of toluene was further dropped. Then, the mixture was held at the same temperature for four hours, yielding an epoxy-group contained polyester modified vinyl polymer solution #J with 50% of a nonvolatile portion and a number-average molecular weight of 50000.

(2) Weather Resistance

The outer appearance was observed and the adhesion test was conducted after 2000 hours of SWOM (Sunshine Weather Meter). The following are the evaluation criteria for weather resistance.

Pass: Adhesion: no separation with 1 mm cross-cut Cellotape (registered trademark)

Outer appearance: normal

No Good: Adhesion: separation occurred with 1 mm cross-cut Cellotape (registered trademark)

Outer appearance: abnormality occurred, such as cracking or separation

(3) Initial Adhesion

With separation performed with 1 mm cross-cut Cellotape (registered trademark), the initial adhesion was evaluated.

(4) Adhesion Against Hot Water

The product was bathed in hot water of 40° C. for 240 hours, removed and then left at room temperature for 30 minutes after which the adhesion test was conducted to evaluate the adhesion against hot water.

TABLE 1

| | Manufactures Examples | | | | | | | | | |
|---|---|---|---|---|---|---|---|---|---|---|
| | 1 | 2 | 3 | 4 | 5 | 6 | 7 | 8 | 9 | 10 |
| polymer solution | #A | #B | #C | #D | #E | #F | #G | #H | #I | #J |
| A200 | 45 | 40 | 40 | 30 | 40 | 40 | 40 | 40 | 30 | 40 |
| IBX | | | | | | | | | 40 | |
| nBMA | | 10 | 10 | 20 | 10 | 20 | | 30 | | 10 |
| BA | | 10 | 10 | 20 | 10 | 40 | 20 | 20 | | 10 |
| 2HEA | | | | | | | 40 | | | |
| FA-2 | | | | | 40 | | | | | |
| FM-5 | | 40 | | 30 | | | | | 30 | |
| FA-10 | 55 | | 40 | | | | | 10 | | 40 |
| glass transition point ° C. | −30 | −19 | −26 | −20 | −15 | −15 | −12 | −15 | 40 | −26 |
| molecular weight | 7000 | 7000 | 7000 | 7000 | 7000 | 7000 | 7000 | 7000 | 7000 | 50000 |

A200: CYCLMER A200 (vinyl monomer containing an epoxy group, produced by Daicel Chemical Industries, Ltd., Tg of homopolymer 20° C.)
IBX: isobornylmethacrylate (LIGHT-ESTER IBX, produced by Kyoeisha Chemical Co. Ltd., Tg of homopolymer 180° C.)
nBMA: butylmethacrylate (LIGHT-ESTER NB, produced by Kyoeisha Chemical Co. Ltd., Tg of homopolymer 20° C.)
BA: butyl acrylate (produced by Toagosei Co. Ltd., Tg of homopolymer −54° C.)
2HEA: 2hydroxyethylacrylate (LIGHT-ESTER HOA, produced by Kyoeisha Chemical Co. Ltd., Tg of homopolymer −15° C.)
FA-2: PLACCEL FA-2 (vinyl monomer containing polyester (2 mol of ε-caprolactone) in a side chain, produced by Daicel Chemical Industries, Ltd., Tg of homopolymer −40° C.)
FM-5: PLACCEL FM-5 (vinyl monomer containing polyester (5 mol of ε-caprolactone) in a side chain, produced by Daicel Chemical Industries, Ltd., Tg of homopolymer −47° C.)
FA-10: PLACCEL FA-10 (vinyl monomer containing polyester (10 mol of ε-caprolactone) in a side chain, produced by Daicel Chemical Industries, Ltd., Tg of homopolymer −60° C.)

(Measured Items)

(1) Mar-Proof

The degree of scratches was tested using a steel wool #0000. The load was 150 g/cm$^2$ with 11 abrasion cycles. The mar-proof was evaluated in six levels of "5" to "0" shown in Table 2 using a haze value (degree of cloudiness).

TABLE 2

| | Evaluation | | | | | |
|---|---|---|---|---|---|---|
| | 5 | 4 | 3 | 2 | 1 | 0 |
| Haze value | 0~1.0 | 1.1~2.0 | 2.1~3.0 | 3.1~5.0 | 5.1~8.0 | 8.1 or greater |

(5) Solvent Resistance

The product was bathed in a WAX remover (trade name: ST7 produced by Yushiro Chemical Industry Co., Ltd.) for ten minutes at 45° C., and was left at room temperature for 24 hours after which a pencil hardness test was conducted to evaluate the solvent resistance.

(6) Thermal Shock Cycle Resistance

After 30 cycles of [(80° C. 95%)×2 hours →room temperature×2 hours→(−40° C.×2 hours)→room temperature×2 hours], evaluation of separation with 1 mm cross-cut Cellotape (registered trademark) was conducted. Likewise, the outer appearance was evaluated after 50 cycles.

(7) Hardness

The hardness was evaluated through the pencil hardness test.

Example 1

5 parts of methylisobutylketone, 10 parts of normal butanol, 2 parts of an anilide oxalate based ultraviolet absorber: Sanduvor 3206 (Clariant in Japan), 2 parts of a hindered amine based light stabilizer: Sanduvor 3058 (Clariant in Japan), and 1 part of tris-acetylacetone aluminum were added to 81 parts of the vinyl polymer solution #A acquired in the Manufacture Example 1, yielding a coating composition #A-1.

10 parts of a curing agent having 3 parts of triphenylslanol dissolved in 97 parts of toluene were added to 100 parts of the coating composition #A-1, the coating composition #A-1 added with the curing agent was sprayed on an ABS resin material degreased with isopropyl alcohol, a polycarbonate resin material (LEXAN LS-11 (produced by GE Plastics Corporation), an acrylic resin material, and a material obtained by applying an acrylic-urethane coated OrigiPlate Z (produced by Origin Electric Co., Ltd.) to an ABS material in such a way that each of cured coats would become 10 μm, and they were left at room temperature for three days after forced drying at 80° C. for 30 minutes, yielding test specimens. The test specimens were molded articles of 10 mm vertical, 5 mm horizontal, 3 mm in thickness. The mar-proof, weather resistance, initial adhesion, adhesion against hot water, solvent resistance, thermal shock cycle resistance and hardness of the individual test specimens were measured. The results are shown in Tables 3 to 6.

Example 2

5 parts of methylisobutylketone, 10 parts of normal butanol, 2 parts of an anilide oxalate based ultraviolet absorber: Sanduvor 3206 (Clariant in Japan), 2 parts of a hindered amine based light stabilizer: Sanduvor 3058 (Clariant in Japan), and 1 part of trois-acetylacetone aluminum were added to 81 parts of the vinyl polymer solution #B acquired in the Manufacture Example 2, yielding a coating composition #B-1.

10 parts of a curing agent having 3 parts of triphenylslanol dissolved in 97 parts of toluene were added to 100 parts of the coating composition #B-1, the coating composition #B-1 added with the curing agent was sprayed on an ABS resin material degreased with isopropyl alcohol, a polycarbonate resin material (LEXAN LS-11 (produced by GE Plastics Corporation), an acrylic resin material, and a material obtained by applying an acrylic-urethane coated OrigiPlate Z (produced by Origin Electric Co., Ltd.) to an ABS material in such a way that each of cured coats would become 10 μm, and they were left at room temperature for three days after forced drying at 80° C. for 30 minutes, yielding test specimens. The test specimens were molded articles of 10 mm vertical, 5 mm horizontal, 3 mm in thickness. The mar-proof, weather resistance, initial adhesion, adhesion against hot water, solvent resistance, thermal shock cycle resistance and hardness of the individual test specimens were measured. The results are shown in Tables 3 to 6.

Example 3

5 parts of methylisobutylketone, 10 parts of normal butanol, 2 parts of an ultraviolet absorber: Sanduvor 3206 (Clariant in Japan), 2 parts of a light stabilizer: Sanduvor 3058 (Clariant in Japan), and 1 part of tris-acetylacetone aluminum were added to 81 parts of the vinyl polymer solution #C acquired in the Manufacture Example 3, yielding a coating composition #C-1. 10 parts of a curing agent containing triphenylslanol in Example 1 were added to 100 parts of the coating composition #C-1, after which test specimens were prepared under the same conditions and similar evaluations were performed on the individual test specimens.

Example 4

5 parts of methylisobutylketone, 10 parts of normal butanol, 2 parts of an ultraviolet absorber: Sanduvor 3206 (Clariant in Japan), 2 parts of a light stabilizer: Sanduvor 3058 (Clariant in Japan), and 1 part of tris-acetylacetone aluminum were added to 81 parts of the vinyl polymer solution #D acquired in the Manufacture Example 4, yielding a coating composition #D-1. 10 parts of a curing agent containing triphenylslanol in Example 1 were added to 100 parts of the coating composition #D-1, after which test specimens were prepared under the same conditions and similar evaluations were performed on the individual test specimens.

Example 5

5 parts of methylisobutylketone, 10 parts of normal butanol, 2 parts of an ultraviolet absorber: Sanduvor 3206 (Clariant in Japan), 2 parts of a light stabilizer: Sanduvor 3058 (Clariant in Japan), and 1.5 parts of tris-acetylacetone aluminum were added to 81 parts of the vinyl polymer solution #B acquired in the Manufacture Example 2, yielding a coating composition #B-2. 10 parts of a curing agent containing triphenylslanol in Example 1 and 0.5 part of Ethyl Silicate 40 (produced by Colcoat Co., Ltd.) which was a partial hydrolytic condensate of tetraethoxysilane as a compound having hydrolytic silyl were added to 100 parts of the coating composition #B-2, after which test specimens were prepared under the same conditions and similar evaluations were performed on the individual test specimens.

Comparative Example 1

5 parts of methylisobutylketone, 10 parts of normal butanol, 2 parts of an ultraviolet absorber: Sanduvor 3206 (Clariant in Japan), 2 parts of a light stabilizer: Sanduvor 3058 (Clariant in Japan), 1 part of tris-acetylacetone aluminum, and 3 parts triphenylsilanol were added to 81 parts of the vinyl polymer solution #E acquired in the Manufacture Example 5, yielding a single-liquid coating composition #E-1. 10 parts of a curing agent containing triphenylslanol in Example 1 were added to 100 parts of the coating composition #E-1, after which test specimens were prepared under the same conditions and similar evaluations were performed on the individual test specimens.

Comparative Example 2

5 parts of methylisobutylketone, 10 parts of normal butanol, 2 parts of an ultraviolet absorber: Sanduvor 3206 (Clariant in Japan), 2 parts of a light stabilizer: Sanduvor 3058 (Clariant in Japan), and 1 part of tris-acetylacetone aluminum were added to 81 parts of the vinyl polymer solution #F acquired in the Manufacture Example 6, yielding a coating composition #F-1. 10 parts of a curing agent containing triphenylslanol in Example 1 were added to 100 parts of the coating composition #F-1, after which test specimens were prepared under the same conditions and similar evaluations were performed on the individual test specimens.

Comparative Example 3

5 parts of methylisobutylketone, 10 parts of normal butanol, 2 parts of an ultraviolet absorber: Sanduvor 3206 (Clariant in Japan), 2 parts of a light stabilizer: Sanduvor 3058 (Clariant in Japan), and 1 part of tris-acetylacetone aluminum were added to 81 parts of the vinyl polymer solution #G acquired in the Manufacture Example 7, yielding a coating composition #G-1. 10 parts of a curing agent containing triphenylslanol in Example 1 were added to 100 parts of the coating composition #G-1, after which test specimens were prepared under the same conditions and similar evaluations were performed on the individual test specimens.

Comparative Example 4

5 parts of methylisobutylketone, 10 parts of normal buthanol, 2 parts of an ultraviolet absorber: Sanduvor 3206 (Clariant in Japan), 2 parts of a light stabilizer: Sanduvor 3058 (Clariant in Japan), and 1 part of tris-acetylacetone aluminum were added to 81 parts of the vinyl polymer solution #H acquired in the Manufacture Example 8, yielding a coating composition #H-1. 10 parts of a curing agent containing triphenylslanol in Example 1 were added to 100 parts of the coating composition #H-1, after which test specimens were prepared under the same conditions and similar evaluations were performed on the individual test specimens.

Comparative Example 5

5 parts of methylisobutylketone, 10 parts of normal buthanol, 2 parts of an ultraviolet absorber: Sanduvor 3206 (Clariant in Japan), 2 parts of a light stabilizer: Sanduvor 3058 (Clariant in Japan), and 1 part of tris-acetylacetone aluminum were added to 81 parts of the vinyl polymer solution #I acquired in the Manufacture Example 9, yielding a coating composition #I-1. 10 parts of a curing agent containing triphenylslanol in Example 1 were added to 100 parts of the coating composition #I-1, after which test specimens were prepared under the same conditions and similar evaluations were performed on the individual test specimens.

Comparative Example 6

5 parts of methylisobutylketone, 10 parts of normal buthanol, 2 parts of an ultraviolet absorber: Sanduvor 3206 (Clariant in Japan), 2 parts of a light stabilizer: Sanduvor 3058 (Clariant in Japan), and 1 part of tris-acetylacetone aluminum were added to 81 parts of the vinyl polymer solution #J acquired in the Manufacture Example 10, yielding a coating composition #J-1. 10 parts of a curing agent containing triphenylslanol in Example 1 were added to 100 parts of the coating composition #J-1, after which test specimens were prepared under the same conditions and similar evaluations were performed on the individual test specimens.

Comparative Example 7

1 part of tris-acetylacetone aluminum was added to a blend of 81 parts of the vinyl polymer solution #B acquired in the Manufacture Example 2 to which 5 parts of methylisobutylketone, 10 parts of normal buthanol, 2 parts of an ultraviolet absorber: Sanduvor 3206 (Clariant in Japan), and 2 parts of a light stabilizer: Sanduvor 3058 (Clariant in Japan) were added, yielding a coating composition #B-3. 0.3 part of SH 6018 ((polycyloxyane containing 6% of a silanol group) Dow Corning Toray) as a silanol-group containing curing agent was added to 100 parts of the coating composition #B-3, after which test specimens were prepared under the same conditions and similar evaluations were performed on the individual test specimens.

TABLE 3

Evaluation of ABS Resin Material

|  |  | Example 1 | Example 2 | Example 3 | Example 4 | Example 5 |
|---|---|---|---|---|---|---|
| mar-proof |  | 5 | 5 | 5 | 5 | 5 |
| weather resistance | outer appearance | pass | pass | pass | pass | pass |
|  | adhesion | pass | pass | pass | pass | pass |
| initial adhesion |  | pass | pass | pass | pass | pass |
| adhesion against hot water |  | pass | pass | pass | pass | pass |
| solvent resistance |  | HB | HB | HB | HB | HB |
| thermal shock cycle resistance | 30 cycle | pass | pass | pass | pass | pass |
|  | 50 cycle | pass | pass | pass | pass | pass |
| hardness |  | HB | HB | HB | HB | HB |

|  |  | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|
| mar-proof |  | 3 | 1 | 2 | 2 | 1 | 5 | 2 |
| weather resistance | outer appearance | pass | pass | naturally separated | naturally separated | naturally separated | pass | pass |
|  | adhesion | separated | separated | separated | separated | separated | separated | separated |
| initial adhesion |  | pass | pass | pass | pass | pass | pass | pass |
| adhesion against hot water |  | whitening separated | separated | separated | separated | separated | pass | separated |
| solvent resistance |  | 3B | 3B | 3B | 3B | HB | HB | 3B |
| thermal shock cycle resistance | 30 cycle | pass | separated | separated | separated | separated | separated | separated |
|  | 50 cycle | pass | whitening | whitening | whitening | pass | pass | whitening |
| hardness |  | B | B | B | B | HB | HB | HB |

TABLE 4

Evaluation of Polycarbonate Resin Material

|  |  | Example 1 | Example 2 | Example 3 | Example 4 | Example 5 |
|---|---|---|---|---|---|---|
| mar-proof |  | 5 | 5 | 5 | 5 | 5 |
| weather resistance | outer appearance | pass | pass | pass | pass | pass |
|  | adhesion | pass | pass | pass | pass | pass |
| initial adhesion |  | pass | pass | pass | pass | pass |
| adhesion against hot water |  | pass | pass | pass | pass | pass |
| solvent resistance |  | HB | HB | HB | HB | HB |

TABLE 4-continued

Evaluation of Polycarbonate Resin Material

| | | | | | | |
|---|---|---|---|---|---|---|
| thermal shock | 30 cycle | pass | pass | pass | pass | pass |
| cycle resistance | 50 cycle | pass | pass | pass | pass | pass |
| hardness | | HB | HB | HB | HB | HB |

| | | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|
| mar-proof | | 3 | 1 | 2 | 2 | 1 | 5 | 2 |
| weather resistance | outer appearance | pass | pass | naturally separated | naturally separated | naturally separated | pass | pass |
| | adhesion | separated | separated | separated | separated | separated | separated | separated |
| initial adhesion | | pass | pass | pass | pass | pass | pass | pass |
| adhesion against hot water | | whitening separated | separated | separated | separated | separated | pass | separated |
| solvent resistance | | 3B | 3B | 3B | 3B | HB | HB | 3B |
| thermal shock | 30 cycle | pass | separated | separated | separated | separated | separated | separated |
| cycle resistance | 50 cycle | pass | whitening | whitening | whitening | pass | pass | whitening |
| hardness | | B | B | B | B | HB | HB | HB |

TABLE 5

Evaluation of Acrylic Resin Material

| | | Example 1 | Example 2 | Example 3 | Example 4 | Example 5 |
|---|---|---|---|---|---|---|
| mar-proof | | 5 | 5 | 5 | 5 | 5 |
| weather resistance | outer appearance | pass | pass | pass | pass | pass |
| | adhesion | pass | pass | pass | pass | pass |
| initial adhesion | | pass | pass | pass | pass | pass |
| adhesion against hot water | | pass | pass | pass | pass | pass |
| solvent resistance | | HB | HB | HB | HB | HB |
| thermal shock | 30 cycle | pass | pass | pass | pass | pass |
| cycle resistance | 50 cycle | pass | pass | pass | pass | pass |
| hardness | | HB | HB | HB | HB | HB |

| | | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|
| mar-proof | | 3 | 1 | 2 | 2 | 1 | 5 | 2 |
| weather resistance | outer appearance | pass | pass | naturally separated | naturally separated | naturally separated | pass | pass |
| | adhesion | separated | separated | separated | separated | separated | separated | separated |
| initial adhesion | | separated | separated | separated | separated | separated | separated | separated |
| adhesion against hot water | | whitening separated | separated | separated | separated | separated | pass | separated |
| solvent resistance | | 3B | 3B | 3B | 3B | HB | HB | 3B |
| thermal shock | 30 cycle | separated | separated | separated | separated | separated | separated | separated |
| cycle resistance | 50 cycle | pass | whitening | whitening | whitening | pass | pass | whitening |
| hardness | | B | B | B | B | HB | HB | HB |

TABLE 6

Evaluation of Material Obtained by Applying Acrylic-Urathane Coating to ABS Resin Material

| | | Example 1 | Example 2 | Example 3 | Example 4 | Example 5 |
|---|---|---|---|---|---|---|
| mar-proof | | 5 | 5 | 5 | 5 | 5 |
| weather resistance | outer appearance | pass | pass | pass | pass | pass |
| | adhesion | pass | pass | pass | pass | pass |
| initial adhesion | | pass | pass | pass | pass | pass |
| adhesion against hot water | | pass | pass | pass | pass | pass |
| solvent resistance | | HB | HB | HB | HB | HB |
| thermal shock | 30 cycle | pass | pass | pass | pass | pass |
| cycle resistance | 50 cycle | pass | pass | pass | pass | pass |
| hardness | | HB | HB | HB | HB | HB |

TABLE 6-continued

Evaluation of Material Obtained by Applying Acrylic-Urathane Coating to ABS Resin Material

| | | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|
| mar-proof | | 3 | 1 | 2 | 2 | 1 | 5 | 2 |
| weather resistance | outer appearance | pass | pass | naturally separated | naturally separated | naturally separated | pass | pass |
| | adhesion | separated | separated | separated | separated | separated | separated | separated |
| initial adhesion | | pass | pass | pass | pass | pass | pass | pass |
| adhesion against hot water | | whitening pass | pass | pass | pass | pass | pass | pass |
| solvent resistance | | 3B | 3B | 3B | 3B | HB | HB | 3B |
| thermal shock cycle resistance | 30 cycle | pass | separated whitening | separated whitening | separated whitening | separated pass | separated pass | separated whitening |
| | 50 cycle | pass | | | | | | |
| hardness | | B | B | B | B | HB | HB | B |

According to the present invention, as a vinyl monomer containing polyester in a side chain is polymerized with a vinyl monomer containing an alicyclic epoxy group, it is possible to provide a coating composition which can be applied to a plastic base material directly or via a base coat, and has good adhesion to the base material, mar-proof and outer coat surface appearance, and has excellent weather resistance, and a molded article coated with the coating composition.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-22817 filed on Feb. 1, 2007, and including specification, claims, drawings and summary. The disclosure of the above Japanese Patent Application is incorporated herein by reference in its entirety.

What is claimed is:

1. A coating composition consisting essentially of, with respect to (1) 100 parts by weight of epoxy-group contained polyester modified vinyl polymer (D) obtained by copolymerization of a vinyl monomer (A) containing an alicyclic epoxy group and a vinyl monomer (B) containing polyester in a side chain, (2) 0.01 to 10 parts by weight of an organic metal compound, and (3) 0.1 to 10 parts by weight of a silicon compound,
   wherein the silicon compound is triphenylsilanol and/or diphenylsilanediol,
   wherein the vinyl monomer (B) containing polyester in the side chain is 30 to 55 parts by weight of with respect to 100 parts by weight of the alicyclic-epoxy-group contained polyester modified vinyl polymer (D),
   wherein the vinyl monomer (B) is acquired by a ring opening reaction of ε-caprolactone with hydroxyl group contained acrylic ester, and contains polyester in a side chain with the ε-caprolactone having an average chain number of not less than 5 mol and not more than 10 mol, wherein the epoxy-group contained polyester modified vinyl polymer (D) has a glass transition point of −60 to 20° C.

2. The coating composition according to claim 1, wherein the silicon compound is triphenylsilanol.

3. The coating composition according to claim 1, wherein the epoxy-group contained polyester modified vinyl polymer (D) includes a vinyl monomer (C) polymerizable with the monomer (A) and the monomer (B).

4. The coating composition according to claim 3, wherein there are 1 to 50 parts by weight of the vinyl monomer (C) with respect to 100 parts by weight of the alicyclic-epoxy-group contained polyester modified vinyl polymer (D).

5. The coating composition according to claim 1, wherein hydroxyl-group contained acrylic ester is hydroxyalkyl (meta)acrylate.

6. The coating composition according to claim 5, wherein the alkyl is ethyl, butyl or propyl.

7. The coating composition according to claim 1, wherein the epoxy-group contained polyester modified vinyl polymer (D) has a number-average molecular weight of 1000 to 40000.

8. The coating composition according to claim 1, wherein there are 1 to 5 parts by weight of the organic metal compound with respect to 100 parts by weight of the alicyclic-epoxy-group contained polyester modified vinyl polymer (D).

9. The coating composition according to claim 1, wherein there are 1 to 5 parts by weight of the silicon compound having the silanol group with respect to 100 parts by weight of the alicyclic-epoxy-group contained polyester modified vinyl polymer (D).

10. The coating composition according to claim 1, further including 0.1 to 10 parts by weight of a compound having a hydrolytic silyl group with respect to 100 parts by weight of the alicyclic-epoxy-group contained polyester modified vinyl polymer (D).

11. The coating composition according to claim 1, further including a ligand of the organic metal compound.

12. A plastic coat article having the coating composition as specified in claim 1 coated directly or via a base coat.

13. The plastic coat article according to claim 12, wherein the plastic is a polycarbonate resin, an ABS resin, an acrylic resin or a resin alloy containing the same.

14. A coating composition consisting essentially of, with respect to (1) 100 parts by weight of epoxy-group contained polyester modified vinyl polymer (D) obtained by copolymerization of a vinyl monomer (A) containing an alicyclic epoxy group and a vinyl monomer (B) containing polyester in a side chain, (2) 0.01 to 10 parts by weight of an organic metal compound, and (3) 0.1 to 10 parts by weight of a silicon compound having a silanol group and not including siloxane bonding,
   wherein the silicon compound is triphenylsilanol and/or diphenylsilanediol,
   wherein the vinyl monomer (B) containing polyester in the side chain is 30 to 55 parts by weight of with respect to 100 parts by weight of the alicyclic-epoxy-group contained polyester modified vinyl polymer (D), wherein the vinyl monomer (B) is acquired by a ring opening reaction of ε-caprolactone with hydroxyl-group contained acrylic ester, and contains polyester in a side chain with the ε-caprolactone having an average chain number of not less than 5 mol and not more than 10 mol, and further including 0.01 to 10 parts by weight of an ultraviolet absorber with respect to 100 parts by weight of the alicyclic-epoxy-group contained polyester modified vinyl polymer (D), wherein the epoxy-group contained polyester modified vinyl polymer (D) has a glass transition point of −60 to 20° C.

15. The coating composition according to claim 14, wherein the silicon compound is triphenylsilanol.

16. The coating composition according to claim 14, further including 0.01 to 10 parts by weight of a light stabilizer with respect to 100 parts by weight of the alicyclic-epoxy-group contained polyester modified vinyl polymer (D).

\* \* \* \* \*